Aug. 22, 1967     M. BURGER     3,337,069
CARGO ELEVATOR AUTOMATIC LOADER AND UNLOADER
Filed Sept. 27, 1965     4 Sheets-Sheet 1

INVENTOR.
MURRAY BURGER
BY
ATTYS.

INVENTOR.
MURRAY BURGER
ATTYS.

Aug. 22, 1967 M. BURGER 3,337,069
CARGO ELEVATOR AUTOMATIC LOADER AND UNLOADER
Filed Sept. 27, 1965 4 Sheets-Sheet 3
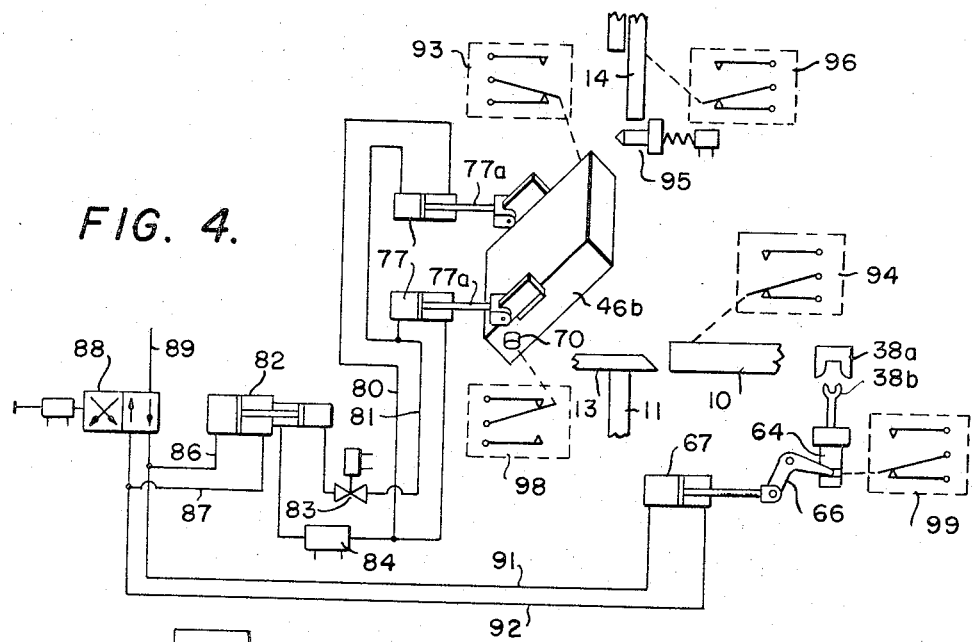
FIG. 4.
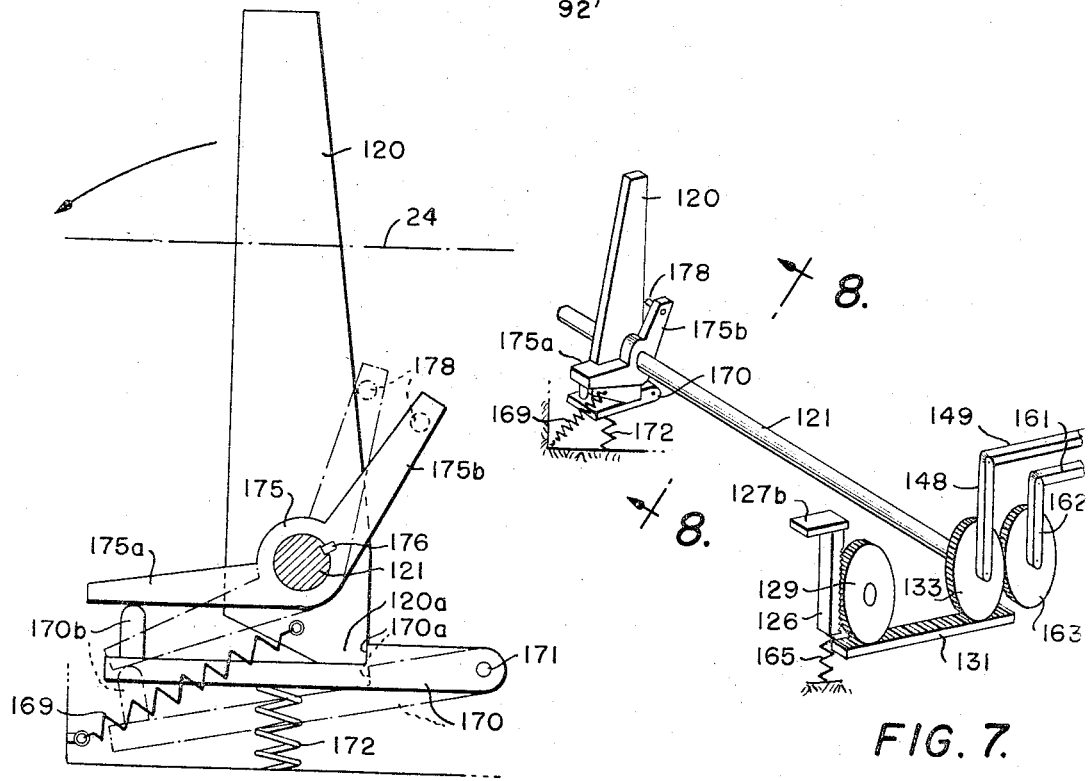
FIG. 8.
FIG. 7.
INVENTOR.
MURRAY BURGER
BY O.E. Hodges
Harvey A. David
ATTYS.

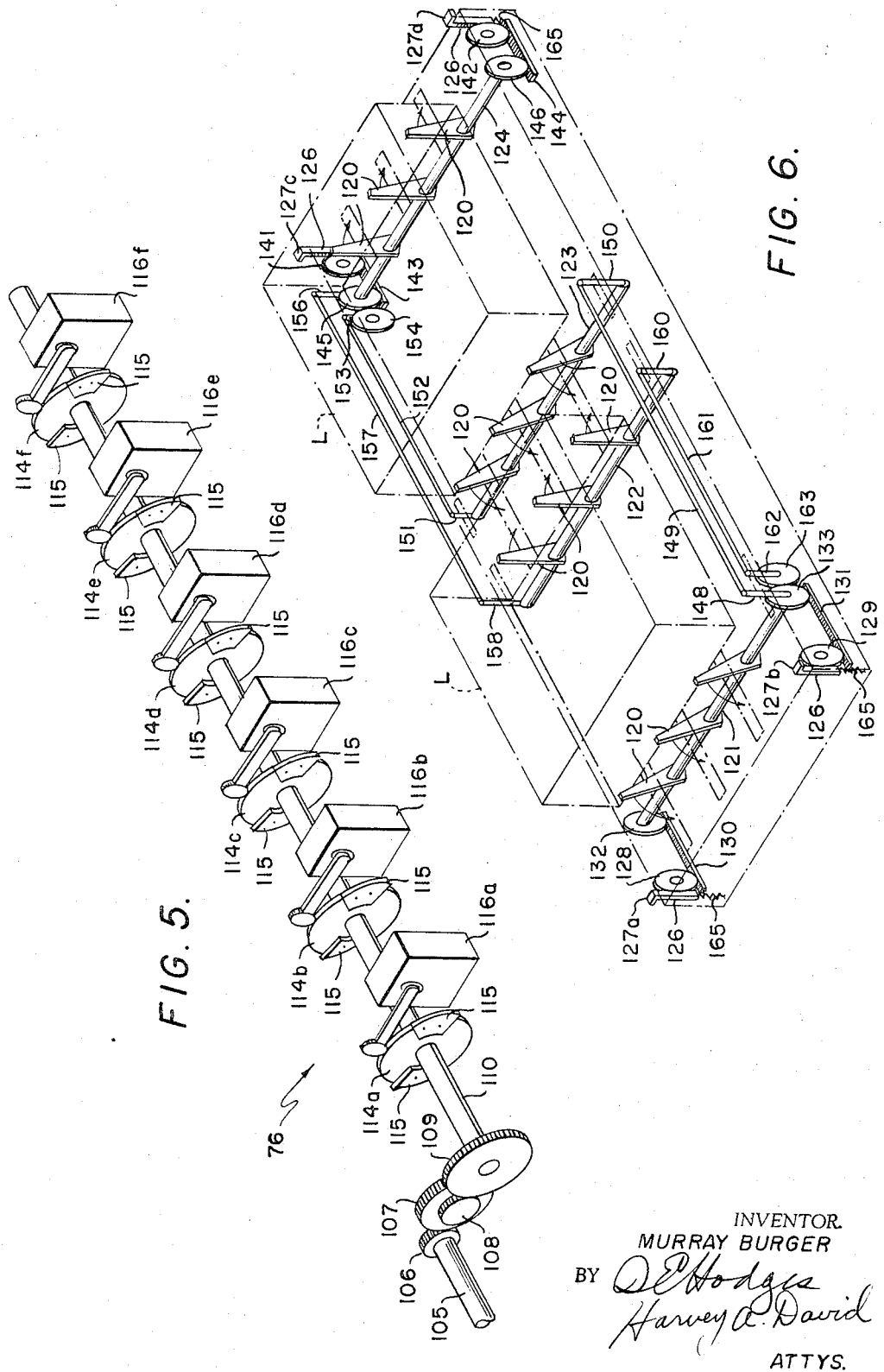

United States Patent Office 3,337,069
Patented Aug. 22, 1967

3,337,069
CARGO ELEVATOR AUTOMATIC LOADER
AND UNLOADER
Murray Burger, Silver Spring, Md., assignor to the United
States of America as represented by the Secretary of
the Navy
Filed Sept. 27, 1965, Ser. No. 490,747
5 Claims. (Cl. 214—89)

ABSTRACT OF THE DISCLOSURE

A conveyor system consisting of a horizontal master conveyor and at least one horizontal slave conveyor. The master conveyor is movable vertically to convey the material received from the slave conveyor between different levels. The means for driving the entire system is contained in the master conveyor. A portion of the slave conveyor is rotated away from the end of the master when the master is to be moved vertically. There are provided on the conveyors brake means, load restraining means and means to connect the drive system between the master and slave units. Actuations of these means is controlled as a function of the position of the rotatable portions of the slave conveyor.

---

The invention described herein may be manufactured and used by or for the Government of the United States of America for governmental purposes without the payment of any royalties thereon or therefor.

This invention relates to material handling apparatus and, more particularly, to conveyor means suitable for transferring articles such as cargo or weapons into and out of an elevator having a platform operating vertically within the confines of a trunk, for example, as on board a ship.

Heretofore, the loading and unloading of elevators such as are used to strike down and hoist weapons, ammunition and general stores on board naval vessels has been accomplished principally by manual labor with hand trucks, dollies and the like. The development and increased use of aircraft carriers in ground support missions has introduced special handling needs in the requirement of a continuous supply of bombs, missiles, and the like which must be brought from a magazine or transfer area deep within a ship to readying or loading decks where they are serviced and/or attached to the aircraft.

With the foregoing in mind, it is one object of the present invention to provide improved power driven material handling apparatus suitable for use in loading and unloading elevators having a platform which operates vertically within the confines of a trunk, the access doorways of which are normally closed by sliding doors of the flame-sealing-type for example, the apparatus being capable of bridging the space required for operation of the sliding doors so as to present a substantially continuous conveyor surface from a deck area exterior of the trunk through the doorway and onto the elevator platform It is another object of this invention to provide improved power-driven material handling apparatus for elevator loading and unloading and which is automatic and fail-safe in operation.

Yet another object of this invention is the provision of elevator loading and unloading apparatus which is capable of automatically indexing or positioning a load in a predetermined position on the elevator platform corresponding to the position in which the load is placed on a conveyor assembly externally of the elevator, whereby the area of the elevator platform may be used to the best advantage and without need for clearance about the load for hand trucks, maneuvering of the load, and the like.

Still another object of this invention is the provision of material handling apparatus for loading and unloading elevators wherein the elevator may be loaded from one end at a first level and be unloaded from the same or the other end at another level.

As another object, the invention aims to accomplish the foregoing through the provision of a first or master conveyor assembly mounted on the elevator platform for vertical movement therewith, and one or more slave conveyor assemblies mounted externally of the elevator trunk at predetermined levels, the latter assembly including first conveyor means for supporting and transporting articles and motor means drivingly connected to the first conveyor means, each slave assembly including second conveyor means for transporting articles, at least a portion of each slave assembly being shiftable through a doorway in the elevator trunk to and from a position immediately adjacent an end of the master assembly for cooperating therewith in the transfer of articles between the respective conveyor means of the assemblies, and transmission means for drivingly coupling the motor means of the master assembly to the conveyor means of the cooperating slave assembly for simultaneous operation thereof with the master assembly, but only when the master assembly is in horizontal alignment with the slave assembly and the latter has its movable portion in the mentioned position immediately adjacent one end of the master assembly.

Other objects and many of the attendant advantages of this invention will be readily appreciated as the same becomes better understood by reference to the following detailed description when considered in connection with the accompanying drawings wherein:

FIG. 4 is a schematic illustration of interlock controls of the apparatus;

FIG. 5 is a perspective view of a distance travel control means;

FIG. 6 is a perspective view schematically illustrating load restraining means forming part of the invention;

FIG. 7 is a fragmentary perspective view of one load restraining member and its actuating and locking mechanisms; and FIG. 8 is an enlarged sectional view taken substantially along line 8—8 of FIG. 7.

Figure 1:
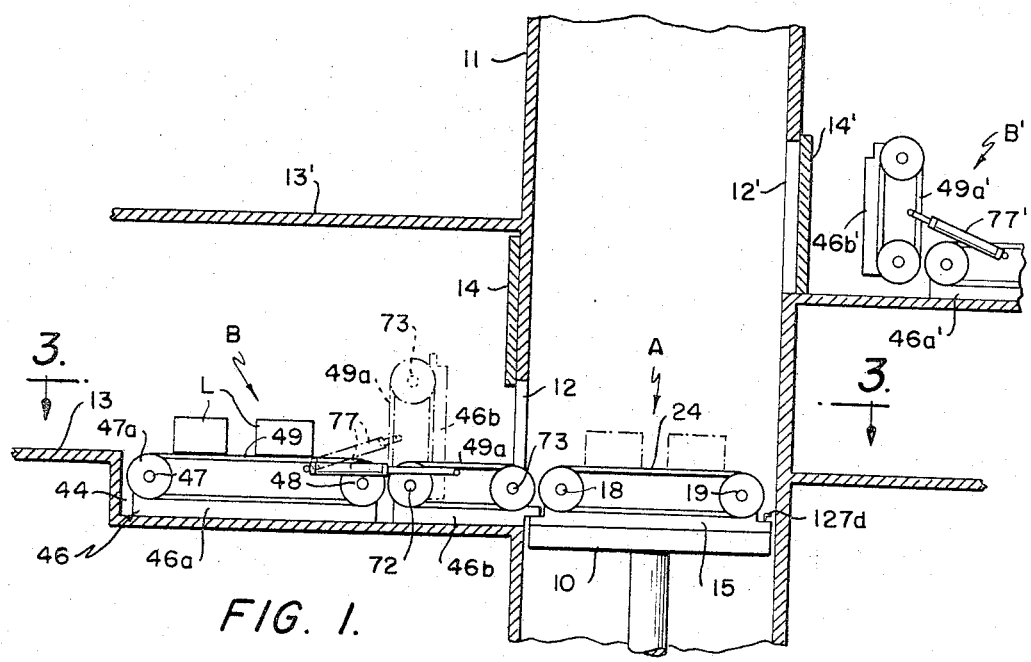
FIG. 1 is a schematic illustration of material handling apparatus embodying the present invention.

In the form of the invention illustrated in the drawings and described hereinafter, there is provided an improved material handling apparatus shown in association with a shipboard elevator including an elevator platform 10 which is movable vertically within the confines of an elevator trunk 11. The trunk 11 is provided with access openings or doorways 12, 12' for loading and unloading at different levels or decks 13, 13'. The access openings or doorways 12, 12' are adapted to be closed by vertically sliding doors 14, 14' respectively, which doors may be of the flame-sealing and/or waterproof-type depending upon the purpose and locations of the decks and the type of service the elevator will provide. As has been noted earlier, the apparatus described herein is particularly suited to the handling of ammunition and weapons, although it is to be understood that this is given by way of example only and that apparatus embodying the invention may be utilized to advantage in many other types of service wherein elevator loading and unloading is performed.

Figure 3:
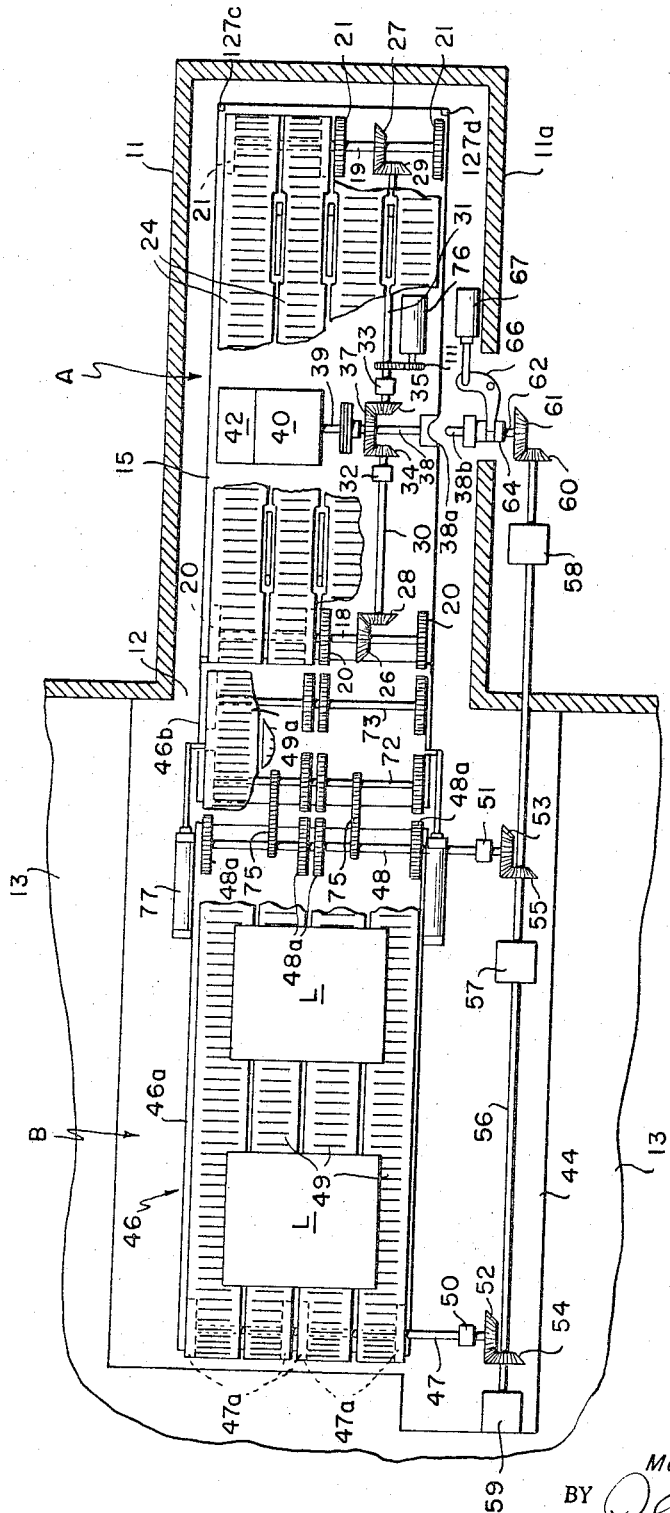
FIG. 3 is an enlarged plan view of the apparatus of FIG. 1 taken substantially along line 3—3 thereof.

With particular reference to FIG. 3, the material handling apparatus comprises a first or master conveyor assembly generally indicated at A, which assembly is mounted on the elevator platform 10 for vertical movement therewith in the elevator trunk 11 between the various decks 13, 13'. The master conveyor assembly A comprises a structural frame 15 on which are suitably journalled parallel, transverse end shafts 18, 19. The shafts 18, 19 are provided with suitable sprocket means, indicated schematically at 20, 21, for supporting and driving endless conveyor means 24 which in this instance is conveniently in the form of a plurality of roller chains to which overlapping aluminum plates are bolted. Various forms of endless conveyor means are known to those skilled in the art to which the invention pertains and accordingly no further detail need be gone into here. Suffice it to say that the endless conveyor means 24 may comprise a plurality of parallel running elements with suitable roller or other support means provided beneath the load bearing portions thereof. The shafts 18, 19 are provided respectively with bevel gears 26, 27 meshing with bevel gears 28, 29 mounted on the outboard ends of longitudinal rotary shafts 30 and 31. The inboard ends of the shafts 30 and 31 are connected through unidirectional clutches 32, 33 with coaxial stub shafts on which are mounted bevel gears 34, 35 which mesh with a bevel gear 37 carried on a transverse shaft 38 connected coaxially at its inner end to the output shaft 39 of a reversible electric gear motor 40. The outboard end of the shaft 38 is provided with a clutch element 38a, the purpose of which will become apparent as the description proceeds.

The motor 40 is drivingly connected through the aforementioned shafts, gears, and clutches to the endless conveyor means 24. Operation of the motor in one direction will effect drive of the conveyor means 24 in one direction through one of the unidirectional clutches 32, 33, while operation of the motor in the other direction will effect drive of the conveyor means 24 in the opposite direction through the other of those clutches.

The motor 40 has connected therewith and electromagnetic brake 42 which, when energized, prevents overriding movement of the conveyor means 24 and motor 40 by a load L in response to the forces such as are active on the load when a ship in which the apparatus is installed undergoes rolling or pitching movements.

The slave conveyor assembly B is mounted externally of the elevator trunk 11 in a well 44 which is defined in the deck 13 adjacent the doorway 12. The slave assembly B comprises a frame 46 having a main portion 46a and a pivotal movable portion 46b. The main frame portion 46a rotatably supports a pair of parallel, transverse shafts 47, 48. The shafts 47, 48 are provided with suitable cogs 47a, 48a for driving endless conveyor means 49 similar to conveyor means 24 of the master conveyor assembly A, and are coaxially connected through unidirectional clutches 50, 51 to stub shafts on which are mounted bevel gears 52, 53, respectively. The bevel gears 52, 53 are meshed with bevel gears 54, 55 mounted on longitudinal shafting 56, which shafting is interrupted by one or more flexible couplings or universal joints 57, 58.

The shafting 56, which runs parallel to the conveyor assemblies A and B, is provided with an electrically controlled brake 59 and is also provided with a bevel gear 60 in meshing engagement with a bevel gear 61 mounted on a stub shaft 62 extending normal to a side wall 11a of the elevator trunk 11. A clutch element 38b is carried by a universal sliding coupling 64 for movement into and out of engagement with the previously mentioned clutch element 38a. When so engaged, rotation of the shaft 38 by the motor 40 is transmitted via the coupling 64, shaft 62, gears 60, 61, shafting 56, and gears 52-55 to the shafts 47, 48, only one of which is, of course, driven for a given direction of motor rotation by reason of the unidirectional clutches 50, 51. Engagement of the clutch elements 38a, 38b is effected by a shifting fork 66 which is pivoted to the deck 13 and is actuated as by a pneumatic cylinder 67 to move the sliding coupling 64 and element 38b into and out of engagement with the element 38a.

The coupling 64 is spring loaded to provide for articulating drive between the clutch elements 38a and 38b. It will be recognized that when the clutch elements 38a, 38b are engaged the conveyor means 49 will operate in the same direction and with the same speed as the conveyor means 24.

The frame portion 46b, which is pivoted by suitable trunnions 70 (see FIG. 4) for upward swinging movement, rotatably supports parallel transverse shafts 72, 73 which are provided with suitable sprockets for supporting and driving endless conveyor means 49a which are structurally similar to conveyor means 24 and 49 and are considered to be an extension of the latter. The shaft 72 is driven from the shaft 48 by suitable roller chains 75 operating on sprockets on the shafts 48 and 72.

Forming part of the master conveyor assembly A is a distance travel control means 76 (FIGS. 3 and 5) which includes an input shaft rotatively coupled to the shaft 31 as by gearing or the like. The distance travel control means 76 serves to control operation of the motor 40 so as to positionally index loads in a manner which will be made apparent as the description proceeds.

Movement of the pivoted portion of the slave conveyor assembly B about trunnions 70 is effected by a pair of double acting hydraulic cylinders 77 which are mounted on the main frame portion 46a and have piston rods 77a connected to the movable frame portion 46b. The cylinders 77 are operable to swing the movable portion of the assembly B from the dotted line position in FIG. 1 to the full line position wherein the movable portion extends through the open doorway 12 and occupies a position immediately adjacent one end of the master conveyor assembly A. When the movable portion of the assembly B is so positioned, the conveyor means 49, 49a, and 24 present a substantially continuous surface for moving loads onto and off of the elevator platform 10.

FIG. 4 illustrates schematically certain interlock controls which are desirable in the operation of the apparatus. In this view it will be seen that the double acting cylinders 77 are connected in parallel across hydraulic lines 80, 81 leading from a pneumatic-hydraulic master cylinder 82 and controlled by a solenoid operated hydraulic locking valve 83 and a pressure control valve 84. The pneumatic portion of the master cylinder 82 is connected by lines 86, 87 to a four-way solenoid control valve 88 connected to a suitable air pressure supply line 89. Additionally, the valve 88 is connected by lines 91, 92 to the sliding coupling and clutch operating cylinder 67.

Suitably mounted in the elevator trunk for operation by the platform 10 is an elevator platform position switch 94 which will be actuated only when the platform is vertically positioned so that the master conveyor assembly A is properly aligned with a slave assembly B at a selected deck level. Actuation of the switch 94 affects release of a solenoid operated door stop and latch 95 so that the door 14 may be raised.

Raising of the door 14 actuates a door "up" switch 96 which energizes the four-way solenoid valve 88 and the hydraulic locking solenoid valve 83, thereby causing the cylinders 77 to lower the pivoted portion of the slave conveyor assembly B into the previously mentioned position immediately adjacent one end of the master assembly A. As the pivoted portion starts to lower, a switch 93 is released to deenergize the solenoid of the door stop and latch 95 so that the latter holds the door 14 in the up position. When the pivoted portion is lowered to the horizontal position, switch 98 is actuated to close relays for system safety switches (not shown) and also to close a relay (not shown) in the power circuit for the motor 40. Operation of the four-way valve 88 also causes actuation of the cylinder 67 to move the sliding coupling 64 to effect engagement of the clutch elements 38a, 38b. Such movement of the coupling 64 actuates a switch 99 to permit appliaction of power to the conveyor drive motor 40. Simultaneously, the switch 99 energizes a brake circuit (not shown) to permit release of brakes 42 and 59 which are fail-safe in operation. Thereafter, operation of the motor 40 in one direction or the other will cause movement of the conveyor means 24, 49 and 49a to effect transfer of a load L to or from the elevator platform.

Assuming the load L in FIG. 1 to have been placed in a predetermined position on the conveyor means 49, and the motor 40 to be operated in a sense to transfer the load to the conveyor means 24 on the platform 10, it is the purpose of the distance travel control means 76 to automatically slow down and deenergize the motor 40 and to set the magnetic brakes 42, 59 with the load positioned or indexed in a desired location on the platform corresponding to its initial position on the conveyor means 49.

Referring to FIG. 5, the distance travel control means 76 comprises an input shaft 105 which is connected through reduction gears 106, 107, 108, 109 to a cam shaft 110. The input shaft 105 is driven by suitable transmission means 111 (FIG. 3) from the shaft 31 of the master conveyor assembly A, and the reduction gears are selected to provide a predetermined rotation of the cam shaft relative to linear movements of a load L on the conveyor means.

Mounted on the cam shaft 110 for rotation therewith are a plurality of cams 114a–114f having adjustable actuating sectors 115. A plurality of electrical switches 116a–116f are disposed adjacent the cams 114a–114f, respectively. The switches 116a–116f are connected by suitable electrical circuitry (not shown) to control the motor 40, the brakes 42, 59, and speed control means for slowing the motor prior to stopping. Thus, cams 114a, 114c, and 114e may have their sectors 115 adjusted to actuate switches 116a, 116c, and 116e in a sequence which will, during transfer of a load L in one direction, slow the drive motor 40, deenergize the drive motor, and then set the magnetic brakes 42, 59 to halt and hold the conveyor means with the load in a predetermined position, for example, in the dotted line position of FIG. 1 on the elevator platform. Similarly, cams 114b, 114d, and 114e may have their sectors 115 adjusted to actuate switches 116b, 116d and 116e in a sequence which will, during transfer of a load in the opposite direction, slow the drive motor 40, deenergize the motor, and then set the magnetic brakes 42, 59 to halt and hold the load in a predetermined position.

Additionally, the cam 114f may have its sectors 115 adjusted to actuate switch 116f as an interlock switch which will prevent operation of the cylinders 77 and 67 while a load is in transit.

When the load L arrives at the dotted line position of FIG. 1 and the interlock switch 116f is actuated, the cylinder 67 may be operated to disengage clutch members 38a, 38b, cylinders 77 may be operated to raise the pivotal portion of the slave conveyor assembly B to the dotted line position. As the pivotal portion reaches its up position the switch 93 is actuated and the solenoid operated door stop 95 may then be actuated to release the elevator door 14 for movement to its closed position. Thereafter, the elevator platform may travel to the level of another deck such as deck 13' of FIG. 2 where a slave conveyor assembly B' is located adjacent a trunk access door 14'.

Figure 2:
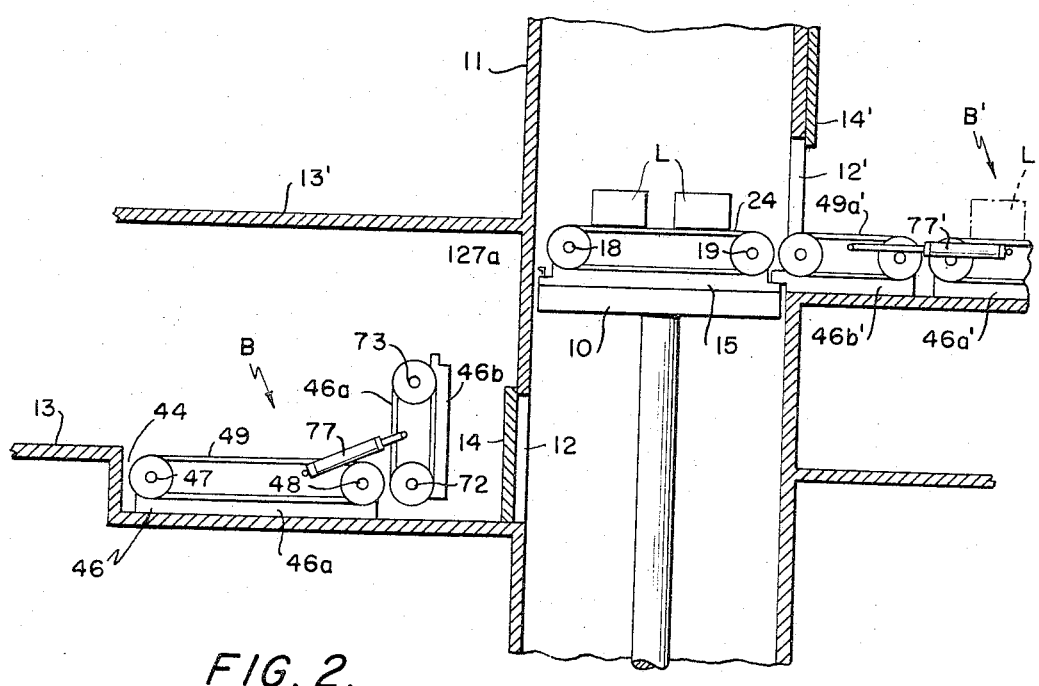
FIG. 2 is a view similar to FIG. 1 showing parts in different operative positions.

When the elevator platform 10 reaches the level as shown in FIG. 2 the door 14' may be opened and the pivotal portion of the slave conveyor assembly B' lowered to a position immediately adjacent one end of the master assembly A. Also, the clutch member 38a may be engaged with a member corresponding to member 38b and connected to slave assembly B' by corresponding transmission means, whereby the slave assembly can be driven from the motor 40 in a directional sense to cause travel of the load L from the elevator onto the slave assembly. Thereafter, the pivotal portion of the slave assembly B' may be raised by its cylinders 77', the door 14' closed, and the platform 10 sent for another load.

Of course, the slave assembly B' could be on the same side of the trunk as the slave assembly B, and additional slave assemblies can be provided at additional levels.

The invention contemplates automatically operated load restraining means for preventing movement of the load L on the conveyor means of the master assembly A, for example, due to rolling or pitching of a ship in which the apparatus is installed, during travel of the elevator platform between levels.

To this end, and is best illustrated in FIG. 6, the master assembly A is provided with a plurality of retractable load restraining members 120 which are adapted to project upwardly from between the conveyor means 24. The members 120 are conveniently arranged in four sets of three, the three members of each set being mounted on and operable by rotation of one of four transverse shafts 121, 122, 123 and 124.

At each of the four corners of the assembly A is provided a vertically reciprocable gear rack 126, each of which is topped by one of four actuating pedals 127a–127d which are adapted to be depressed by the pivotal portions of slave conveyor assemblies B, B' upon being moved to a lowered position.

The racks 126 at one end of the assembly A are in meshing engagement with gears 128, 129 which are in turn in meshing engagement with horizontally reciprocable racks 130, 131. The racks 130, 131 engage gears' 132, 133 at opposite ends of the shaft 121.

Similarly, the racks 126 at the other end of the assembly A are in meshing engagement with gears 141, 142 which are in turn in meshing engagement with horizontally reciprocable racks 143, 144. The racks 143, 144 engage gears 145, 146 at opposite ends of the shaft 124.

The shaft 121 is provided at one end with a crank arm 148 which is connected by a rod 149 to a crank arm 150 fixed to one end of shaft 123. The other end of shaft 123 is provided with a crank arm 151 which is connected by a rod 152 to a crank arm 153 extending from a gear 154.

The gear 154 is in meshing engagement with the gear 145 on shaft 124 which is provided with a crank arm 156 connected by a rod 157 to a crank arm 158 fixed to one end of shaft 122. The other end of shaft 122 is provided with a crank arm 160 which is connected by a rod 161 to a crank arm 162 extending from a gear 163 in mesh with gear 133.

By reason of the foregoing gears, crank arms and connecting rods, shafts 121 and 123 are interconnected to be rotated in a like direction upon depressing of one or more of the pedals 127a–127d while shafts 122 and 124 are interconnected to be rotated in a like direction with one another but opposite to rotation of shafts 121, 123. Such movements of the shafts are utilized to retract the restraining members 120 in the directions indicated by their respective arrows to positions below the upper surface of the conveyor means 24. Return of the pedals, racks, connecting rods and crank arms to the positions illustrated in FIG. 6, upon release of all of the pedals is conveniently effected by springs 165 acting on the racks 126.

The restraining members 120 are so connected to their supporting shafts 121–124 that in the event a portion of a load overlies one or more of the members 120, the other members will be able to return to their upright, restraining positions in which they become locked while those which the load overlies remain retracted. The manner in which this is accomplished is best shown in FIGS. 7 and 8 illustrating one of the restraining members 120 on its shaft 121, and to which reference will now be made.

The member 120, which is rotatable with respect to shaft 121, is resiliently biased toward its illustrated upright position by a spring 169 and is normally locked against counterclockwise movement from that position by engagement of the lower end 120a thereof with a shoulder 170a of a latch 170. The latch 170 which is pivoted at 171 to a suitable frame of assembly A and is biased toward its full line, latching position by a spring 172.

The latch 170 is movable to a restraining member releasing position illustrated in broken lines by means of a cam 175 which is fixed to the shaft 121 as by a key 176. The cam 175 comprises an arm 175a adapted to engage a post 170b of the latch to effect movement of the latter to its broken line position upon initial rotation of the shaft 121 when a pedal 127 is depressed. The member 120 is thereby released for movement with the shaft 121 by engagement of the member by a projection 178 on an arm 175b of the cam 175 which moves the member to a retracted position below the surface level of the conveyor means 24.

Thereafter, if the pedals 172a–172d are released, the shaft 121 will be rotated by the influence of springs 165 to return the cam 175 to its full line position. If the member 120 is obstructed by an overlying load, it will remain in its retracted position. However, if there is no such overlying load, or if one is removed, the member 120 will be raised by its spring 169 to its restraining position in which it will automatically be locked by latch 170. Each of the members 120 is, of course, associated with a cam, latch and springs corresponding to those just described.

From the foregoing detailed description of an exemplary embodiment of the invention, it will be appreciated that there has been provided thereby improved material handling conveyor apparatus which satisfies the previously stated objects and advantages, as well as others apparent from the description.

Obviously many modifications and variations of the present invention are possible in the light of the above teachings. It is, therefore, to be understood that, within the scope of the appended claims, the invention may be practiced otherwise than as specifically described.

What is claimed is:

1. Material handling apparatus for transferring articles onto and off of an elevator platform operable vertically within predetermined confines, said apparatus comprising:
   a master conveyor assembly mounted on said elevator platform for movement therewith;
   said master assembly including horizontal conveyor means for supporting and transporting articles, and motor means drivingly connected to said conveyor means;
   a slave conveyor assembly mounted externally of said confines at a predetermined level;
   said slave assembly including conveyor means for supporting and transporting articles, at least a portion of said slave conveyor assembly being shiftable to and from a position immediately adjacent an end of said master assembly for transfer of articles between the respective conveyor means of said assemblies, and transmission means for drivingly coupling said motor means to said conveyor means of said slave assembly for operation thereof simultaneously with operation of the conveyor means of said master assembly when the latter is in horizontal alignment with said slave assembly and said slave assembly has said portion in said position immediately adjacent one end of said master assembly;
   brake means operative to prevent operation of said conveyor means of said master and slave assemblies; and
   interlock switch means responsive to movement of said movable portion of said slave assembly to said position immediately adjacent said master assembly to permit release of said brake means and energizing of said motor.

2. Material handling apparatus for transferring articles onto and off of an elevator platform operable vertically within predetermined confines, said apparatus comprising:
   a master conveyor assembly mounted on said elevator platform for movement therewith;
   said master assembly including horizontal conveyor means for supporting and transporting articles, and motor means drivingly connected to said conveyor means;
   a slave conveyor assembly mounted externally of said confines at a predetermined level;
   said slave assembly including conveyor means for supporting and transporting articles, at least a portion of said slave conveyor assembly being shiftable to and from a position immediately adjacent an end of said master assembly for transfer of articles between the respective conveyor means of said assemblies, and transmission means for drivingly coupling said motor means to said conveyor means of said slave assembly for operation thereof simultaneously with operation of the conveyor means of said master assembly when the latter is in horizontal alignment with said slave assembly and said slave assembly has said portion in said position immediately adjacent one end of said master assembly;
   load restraining means including a plurality of restraining members movable between load restraining positions and retracted, non-restraining positions;
   latch means for releasably locking said restraining members in said restraining positions; and
   actuating means operable to release said latch means and to move said restraining members to said retracted positions in response to movement of said movable portion of said slave assembly to said position immediately adjacent an end of said master assembly.

3. Material handling apparatus as defined in claim 2 and comprising:
   biasing means for urging said restraining members to said restraining positions upon movement of said movable portion of said slave assembly from said position immediately adjacent an end of said master assembly;
   said biasing means urging said restraining members individually toward said restraining positions, whereby in the event one or more of said members are obstructed by a load, the other of said members will be returned to said restraining positions.

4. Material handling apparatus as defined in claim 1 and wherein said movable portion of said slave conveyor assembly is pivoted for swinging movement between vertical and horizontal positions.

5. Material handling means as defined in claim 1 and wherein said master conveyor assembly further comprises:
   distance travel control means;
   said control means comprising switch means actuable in relation to predetermined movement of said conveyor means and operative to control energization of said motor for indexing a load in a predetermined position.

References Cited
UNITED STATES PATENTS

| | | | |
|---|---|---|---|
| 1,969,002 | 7/1934 | Gleichman | 214—16 |
| 2,536,756 | 1/1951 | Lopez. | |
| 2,705,570 | 4/1955 | Maissian | 198—96 X |
| 2,899,086 | 8/1959 | Saint-Andre | 214—16 |
| 3,233,761 | 2/1966 | McCartney et al. | 214—84 |

GERALD M. FORLENZA, *Primary Examiner.*

ALBERT J. MAKAY, *Examiner.*